United States Patent Office 2,860,508
Patented Nov. 18, 1958

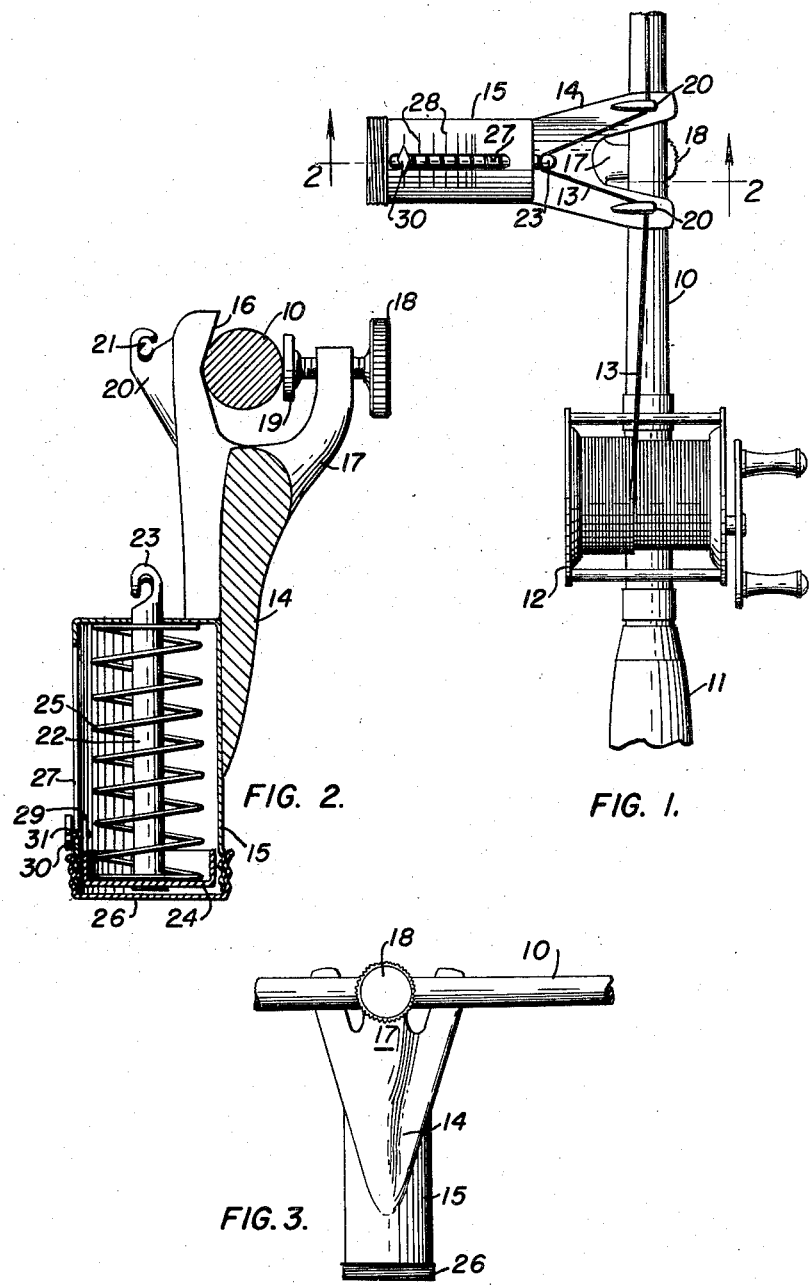

2,860,508

LINE TENSION-WEIGHT SCALE

Shirley Johnson, Mineral Wells, Tex.

Application November 7, 1955, Serial No. 545,403

4 Claims. (Cl. 73—144)

This invention relates to scales for measuring the tension or loads on fishing lines, and has reference to a demountable unit for that purpose.

An object of the invention is to provide a convenient and efficient weight or tension scale for the described purpose.

A particular object is to provide a fishing line tension-weight scale which may be disconnected before casting a lure or bait, yet one which may be quickly connected with the line after the lure or bait hits the water.

A further object of the invention is to provide a fishing line tension-weight unit which will fit various types of fishing poles and rods, and one which will operate accurately regardless of its location along the length thereof.

These and other objects will become apparent from the following description and accompanying drawing, wherein:

Figure 1 is a plan view of a length of fishing rod showing a preferred embodiment of the invention mounted thereon.

Figure 2 is an enlarged sectional view taken approximately on line 2—2 of Figure 1, and Figure 3 is a bottom view of the form of the invention shown in Figures 1 and 2.

The form of the invention shown is for use on a fishing pole or rod 10 which may include a handle 11 and a reel 12. The fishing line 13 is wound on the reel 12 and extends outwardly along the length of the rod through eyes or guides, not shown, all in the usual manner.

The line tension-weighing device comprising the invention includes an elongated body or arm 14 having an aligned cylindrical housing 15 mounted on the upper extending portion thereof. The lower surface of the inner or rod attaching portion of the arm 14 is transversely grooved, as at 16, for engaging the upper surface of the rod 10. There is an integral arcuate extension or neck 17 projecting from the arm 14 for threadedly supporting a thumb screw 18 spaced from and directed toward the center of the groove 16 for engaging the lower surface of the rod 10. A swivel or rotatable foot 19 may be provided on the inner end of the thumb screw 18 for engaging the rod 10 and whereby indentations in the rod will be avoided.

As viewed from above, the arm 14 is substantially triangular and includes integral hook eyes 20 above the rod 10 and equally spaced from the longitudinal center line of said arm. The openings 21 through the hook eyes 20 provide guides for the fishline 13 substantially parallel with the length of the rod 10.

The cylindrical housing 15 is closed at its inner end and slidably receives a cylindrical pin 22 therethrough, the extending end of which pin is in the form of a hook 23 for slidably engaging the fishline 13 outwardly of the alignment between the two hook eyes 20 and in a direction toward said housing. The inner end of the pin 22 is secured to the center of a flanged disc or cup 24, which cup is arranged to receive one end of a coiled compression spring 25 mounted between the same and the inner surface of the closed end of the cylindrical housing 15. A screw cap 26 is provided on the outer extending end of the housing 15 and whereby the spring, pin and hook assembly, including the cup 24, may be installed.

There is a longitudinal slot 27 on the upper surface of the cylindrical housing 15 and calibrations 28 are marked on the surface of said housing and on opposite sides of said slot. An integral projection 29 extends from the cup 24 and beneath the slot 27 for supporting a pointer 30 outwardly of said slot and for registering with the calibrations 28. The pointer 30 is supported on the projection 29 by means of a pin 31, and which pin is slidably movable in the slot 27.

In operation, the tension-weighing device described is secured at any desired position along the length of the rod 10 by means of the thumb screw 18 on the neck 17 and the groove 16 on the inner surface of the arm 14. The cylindrical housing is arranged to project perpendicularly from the rod 10 with the slot 27 and calibrations on the upper surface thereof. It is pointed out that the cylindrical housing 15 may project either to the user's left or to his right. When casting, the line 13 may be disengaged from the hook 23 so as to reduce friction, but the line may be so engaged in the hook if desired. When casting without engagement of the line 13 in the hook 23 greater distance may be attained. In the latter event, the line 13 may be quickly engaged in the hook after the bait or lure hits the water. If a large fish is hooked, the position of the pointer will indicate the tension applied to the line. Thus, the fisherman will know to play out line until the fish is exhausted and after which it may be reeled in. The invention may also be used for trolling and, according to the position of the pointer 30, the speed of the boat may be increased or decreased so as to not overtax the breaking strength of the line.

Additionally, the invention may be used as a weighing device after a fish is caught by merely suspending the fish in the air and noting the relative position of the pointer 30 on the calibrations 28.

The invention is not limited to the exemplary construction herein shown and described, but may be made in various ways within the scope of the appended claims.

What is claimed is:

1. A tension-weight scale for use on a fishing rod, said scale comprising an arm adapted to be secured to said rod and project laterally therefrom, fishline guides on said arm at the end thereof adjacent said rod, said guides being spaced from each other and substantially parallel with the length of said rod, a spring scale mounted on said arm at the end thereof opposite said guides, said spring including a movable actuating member arranged for longitudinal movement on a line perpendicular to and between said guides, and means in said actuating member slidably receiving the fishline of said rod.

2. A tension-weight scale for use on a fishing rod as defined in claim 1, and wherein said arm is provided with a groove on a surface thereof adapted to engage the upper surface of said rod, and wherein said arm includes an integral neck projecting to a position opposite the lower portion of said rod when said arm is in place, and a thumb screw through said neck, the inner end of which is directed toward the center of said groove.

3. A tension-weight scale for use on a fishing rod as defined in claim 1, and wherein said guides are in the form of hook eyes and wherein said means in said actuating member slidably receiving the fishline of said rod is a hook.

4. A tension-weight scale for use on a fishing rod, said scale comprising a triangular arm having a transverse groove adapted to fit said rod on one side thereof, a neck extending from said arm to the side of said rod opposite said groove, a thumb screw threadedly secured in said neck and directed toward said rod, hook eyes on said arm at corners thereof and spaced from each other, said hook eyes being positioned to define a line substantially parallel with the length of said rod, a cylindrical housing mounted on said arm opposite said hooks, a pin extending outwardly through said housing toward said hooks, a spring in said housing engaging said pin, said spring being arranged to normally urge said pin in a direction opposite said hooks, the extending end of said pin including a hook thereon, and weight indicating means carried by said pin.

References Cited in the file of this patent

UNITED STATES PATENTS

| | | |
|---|---|---|
| 1,277,874 | Crowell | Sept. 3, 1918 |
| 1,380,251 | Riba | May 31, 1921 |
| 1,971,000 | Field | Aug. 21, 1934 |
| 2,529,320 | Vibber | Nov. 7, 1950 |